(12) United States Patent
Rouleau

(10) Patent No.: US 7,119,456 B2
(45) Date of Patent: Oct. 10, 2006

(54) SWITCH SYSTEM CAPABLE OF AUTOMATIC CONFIGURATION

(75) Inventor: James E. Rouleau, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 145 days.

(21) Appl. No.: 10/428,876

(22) Filed: May 2, 2003

(65) Prior Publication Data
US 2004/0217649 A1 Nov. 4, 2004

(51) Int. Cl.
*B60L 1/00* (2006.01)
(52) U.S. Cl. .................... 307/10.1; 439/955
(58) Field of Classification Search .............. 307/10.1; 439/955
See application file for complete search history.

(56) References Cited

U.S. PATENT DOCUMENTS

| | | | | |
|---|---|---|---|---|
| 3,213,418 | A * | 10/1965 | Skinner ................. | 340/475 |
| 4,317,073 | A * | 2/1982 | Blaszkowski ............ | 318/483 |
| 4,454,596 | A * | 6/1984 | Wunsch et al. .......... | 361/680 |
| 4,697,092 | A * | 9/1987 | Roggendorf et al. ..... | 307/10.1 |
| 4,942,571 | A * | 7/1990 | Moller et al. ........... | 370/407 |
| 5,486,817 | A * | 1/1996 | Ina ........................ | 340/3.42 |
| 5,956,247 | A * | 9/1999 | Settles et al. ............ | 700/11 |
| 6,349,616 | B1 * | 2/2002 | Onodera et al. ......... | 74/552 |
| 6,365,852 | B1 * | 4/2002 | Leng et al. ............. | 200/61.54 |
| 6,420,845 | B1 * | 7/2002 | Mackel et al. ........... | 318/443 |
| 6,421,593 | B1 * | 7/2002 | Kempen et al. ......... | 701/48 |
| 6,522,935 | B1 * | 2/2003 | Imaizumi et al. ........ | 700/12 |
| 6,563,339 | B1 * | 5/2003 | Pekny et al. ............. | 326/33 |
| 2002/0150874 | A1 * | 10/2002 | Singh et al. ............. | 434/340 |

OTHER PUBLICATIONS

Motorola Technical Data Sheets for the MC68HC05B6 Microcomputer Unit.*

* cited by examiner

Primary Examiner—Robert Deberadinis
Assistant Examiner—Daniel Cavallari
(74) Attorney, Agent, or Firm—Michael D. Smith

(57) ABSTRACT

A switch system capable of being automatically configured and used with any electrical system, particularly vehicle electrical systems, having an operator-activated control and an electrical device. This switch system generally includes an electro-mechanical switch and a switch module. Upon activation of an operator-activated control, such as a turn signal lever, the electro-mechanical switch sends an electrical activation signal to the switch module. The switch module uses an electrical identification signal, also obtained from the electro-mechanical switch, and a look-up table to convert the activation signal into an electronic control message. The electronic control message is then used to control a corresponding electrical device, such as a turn signal lamp. A particular electro-mechanical switch embodiment providing error detecting capabilities is also shown.

20 Claims, 5 Drawing Sheets

SWITCH SYSTEM CAPABLE OF AUTOMATIC CONFIGURATION

FIELD OF THE INVENTION

The present invention generally relates to a switch system for operating an electrical device and more particularly, a vehicle switch system capable of automatic switch configuration.

BACKGROUND OF THE INVENTION

Electro-mechanical switches are used to control electrical devices located throughout a vehicle. For instance, switches of this type are often used to control windshield wipers, cruise control units, turn signals, horns, etc., and can be mounted in a variety of vehicle interior locations, including on the steering wheel.

Traditionally, several methods have been used to couple an electro-mechanical switch, such as a steering column mounted switch, to an electrical device. According to one method, an electro-mechanical switch directly provides power from a switch output to an input of the electrical device. That is, power is supplied to the electro-mechanical switch such that when engaged, the switch provides power directly to the electrical device. This type of switch arrangement may be susceptible to certain drawbacks, such as larger-gauged wiring harnesses, increased power losses, high energy power distribution through certain components, and lack of flexibility regarding design changes.

According to another method for coupling electro-mechanical switches to electrical devices, the switches have electrical outputs customized to match electrical inputs of a switch module, which acts as an intermediary between the switch and the electrical device. This type of arrangement suffices for certain vehicle electrical systems, however, the more options and permutations available the more complex it becomes. For instance, consider the situation where a base-level switch having a first functionality and an up-level switch having a second functionality are both available. According to this method, the manufacturer would have to provide two separate switches, one for each level, two separate switch modules, one for each switch, and two separate wiring harnesses for connecting the switch and switch module pair. This type of arrangement can increase the cost of manufacturing, as more types of specially designed components are required, as well as complicate the logistics of determining which switch and wire harness is to be used with which switch module.

Thus, it would be advantageous to provide a switch system having an electro-mechanical switch and a switch module, where a single switch module of a standard design is capable of automatically configuring and operating with a variety of electro-mechanical switches.

SUMMARY OF THE INVENTION

In accordance with the present invention, there is provided a switch system for use with an operator-activated control and an electrical device. The switch system includes an electro-mechanical switch and a switch module. Engagement of the operator-activated control causes the electro-mechanical switch to send an activation signal to the switch module, which is in turn capable of utilizing an identification signal to convert the activation signal into an electronic control message. The electronic control message is then used to control the operation of the electrical device.

The present invention also includes a method for automatically configuring and operating a switch system, such as but not limited to, the switch system stated above.

Objects, features and advantages of this invention include providing a switch system capable of controlling the operation of an electrical device with an electronic control message, instead of directly powering the electrical device. Also, the switch system of the present invention is capable of standardizing parts by using a single switch module that can interact with numerous types of electro-mechanical switches, as opposed to requiring separate customized switch modules for each electro-mechanical switch that is used. Also, the switch system of the present invention simplifies both the design and manufacturing processes, as the standardized switch module is capable of automatically configuring and communicating with the various types of electro-mechanical switches. Furthermore, the switch system shown here provides increased flexibility for subsequent upgrades and other changes. These are but a few of the advantages that will become apparent from the written description and accompanying drawings.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
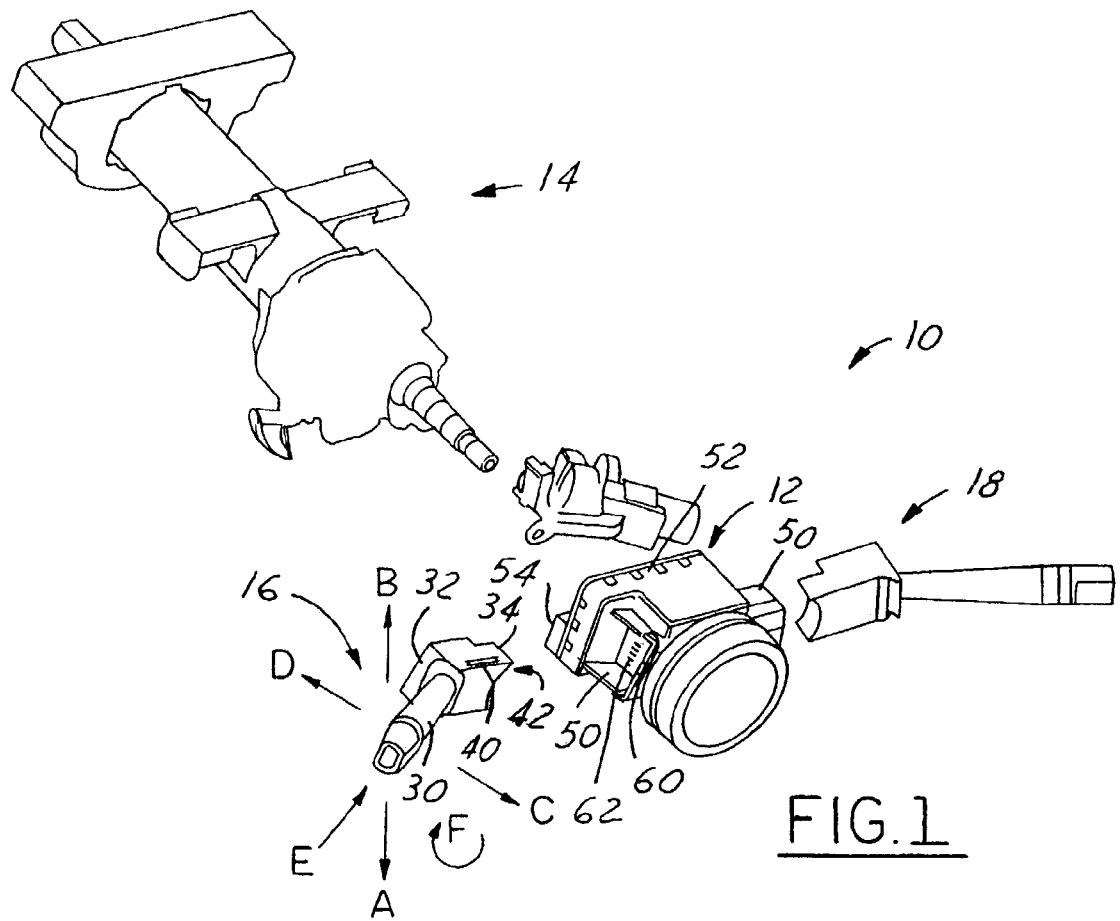
FIG. 1 is an overview of an embodiment of the switch system of the present invention mounted on a vehicle steering column.

The switch system of the present invention can be used with any electrical system having a switch-controlled electrical device, particularly a vehicle electrical system. Turning now to FIG. 1, there is shown one implementation of an embodiment of the switch system of the present invention, where a switch system 10 is attached to a vehicle steering column assembly. Upon activation, an operator-activated control, such as a lever assembly, causes a corresponding electro-mechanical switch (not shown in FIG. 1) to send an electrical activation signal to a switch module. The switch module, in turn, uses an identification signal and a look-up table to convert the activation signal into a corresponding electronic control message which is then sent to either an electronic control unit or directly to an electrical device. The switch system 10 of the present invention generally includes an electro-mechanical switch (not shown in FIG. 1) and a switch module 12. In this particular embodiment, the switch system is used in connection with a steering column assembly 14, a first lever assembly 16 and a second lever assembly 18.

Lever assemblies 16 and 18 are examples of operator-activated controls, and are used by an operator to activate a corresponding electro-mechanical switch, which in turn sends an activation signal to switch module 12. The particular lever assembly 16 shown here controls the turn signal and head lamps, while lever assembly 18 controls a windshield wiper unit. Lever assembly 16 generally includes a pivoting handle section 30, a stationary section 32 and a male connection member 34. For present purposes, lever assemblies 16 and 18 are equivalent, thus, the following description of lever 16 is representative of both lever assemblies. Handle section 30 is pivotally received in stationary section 32 such that an operator may engage the handle and pivot it in one of several directions to activate a corresponding electro-mechanical switch. As will be discussed in greater detail, the electro-mechanical switch has numerous switching elements, one for each of the directions in which the handle may be pivoted. In addition to pivotally receiving the handle section, stationary section 32 also houses the electro-mechanical switch. Section 32 and male connection member 34 may either be separate components or they may be integrally formed together. Male connection member 34 is shaped to snap-fit into the switch module 12, and generally includes snap-fit attachment features 40 and electrical terminal contacts 42. Attachment features 40 mechanically interact with corresponding attachment features of the switch module and contacts 42 electrically interact with corresponding terminal contacts of the switch module, such that lever assembly 16 is both mechanically and electrically coupled to switch module 12.

Switch module 12 acts as an intermediary between an operator-activated control, such as lever assembly 16, and an electrical device, such as a turn signal lamp, and generally includes one or more female connection members 50, a mounting feature 52, a main electrical connection 54 and numerous electronic components (not shown in FIG. 1). The female connection member 50 interacts with male connection member 34; thus, switch module 12 includes one female connection member for each lever assembly, or other operator-activated control, with which it directly interfaces. Therefore, the switch module of FIG. 1 includes two female connection members 50, one for the first lever assembly and one for the second. The female connection member includes a snap-fit attachment feature 60 and an electrical terminal contact 62, which respectively interact with the lever assembly components of the same name. According to this embodiment, mounting feature 52 securely fastens switch module 12 to steering column assembly 14 such that a portion of the steering column rotatably extends through an opening in the switch module. Alternative mounting arrangements could easily be employed to locate switch module 12 in a variety of different locations, not just on the steering column assembly. Main electrical connection 54 generally couples switch module 12 with a larger overall electrical system which includes, amongst other components, the electrical device being controlled by this switch system.

It should be noted, while the particular embodiment shown in FIG. 1 is a preferred implementation of switch system 10, it has only been provided for exemplary, not limiting purposes. For instance, even though the operator-activated controls shown here are lever-type controls (first and second lever assemblies 16 and 18), other types of operator-activated controls could just as easily be employed. These include push-button controls, turn-dial controls, flip-switch controls, electro-optical controls, membrane switch controls, pressure sensor controls, or any other type of control capable of activating an electro-mechanical switch in response to an operator action. Also, the operator-activated controls do not have to be mounted on a steering column assembly. They could be mounted on an interior door panel, instrument panel, center consol, or any other location, inside or outside of a vehicle, where an operator could use them to control an electrical device. Furthermore, the switch system of the present invention could be used to operate electrical devices other than exterior lamps and a windshield wiper unit. They could control an audio system, a cruise control unit, power windows, power door locks, and a power sunroof, to name but a few of the electrical devices capable of being used with the present invention. Accordingly, switch system 10 of the present invention can be used with any type of operator-activated control capable of activating an electro-mechanical switch that controls the operation of an electrical device.

Figure 2:
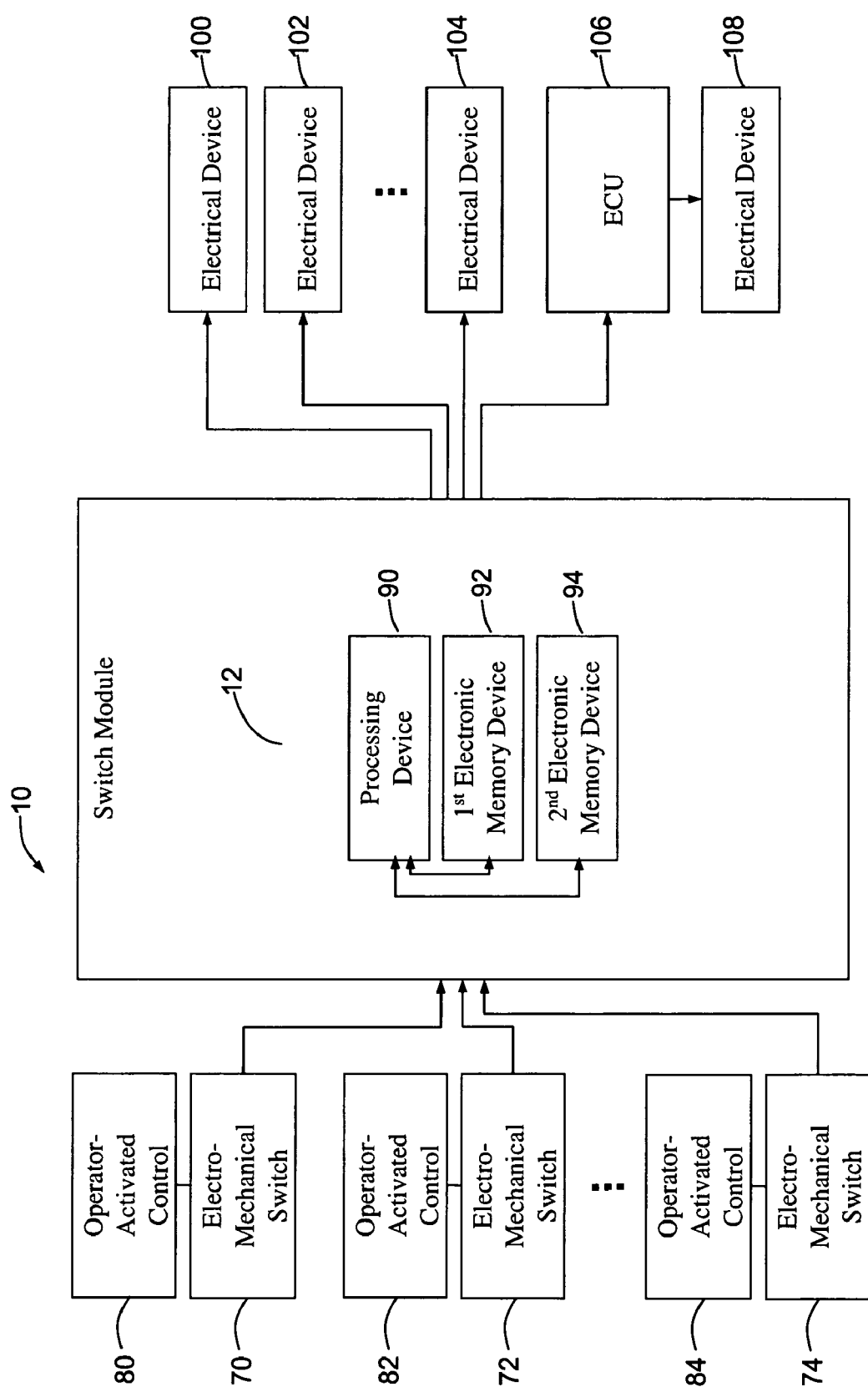
FIG. 2 is an electrical overview of an embodiment of the switch system of FIG. 1.

Referring to FIG. 2, a general electrical overview of an electrical system utilizing an embodiment of switch system 10 is shown, and generally includes one or more electro-mechanical switches 70, 72, 74, corresponding operator-activated controls 80, 82, 84, switch module 12, electrical devices 100, 102, 104, and ECU/electrical device pair 106, 108. The number of electro-mechanical switches that switch module 12 can accommodate is dependent upon the particular design of switch system 10, but is theoretically unlimited. Preferably, switch module 12 typically accommodates a half dozen or so switches. Each electro-mechanical switch 70, 72, 74 is operably coupled to a corresponding operator-activated control 80, 82, 84, respectively. The electro-mechanical switches 70, 72, 74 are equivalent; thus, the following discussion of switch 70 is representative of the other switches as well. Electro-mechanical switch 70 is operably coupled to operator-activated control 80 and is electrically coupled to switch module 12. The electro-mechanical switch may be designed to either directly receive the mechanical force from the corresponding operator-activated control 80, or it could receive an electrical signal indicative of the state of the operator-activated control. In a preferred embodiment, electro-mechanical switch 70 is coupled to handle section 30, or any other appropriate operator-activated control 80, such that sufficient movement of the handle section causes the switch to change states. Alternatively, a separate component could be used to convert the mechanical movement of the handle section into an electrical signal that is sent to the switch. In either case, electro-mechanical switch 70 receives an input, changes its operative state if appropriate, and provides a low-voltage activation signal to switch module 12 that is representative of the state of the switch.

Figure 3:
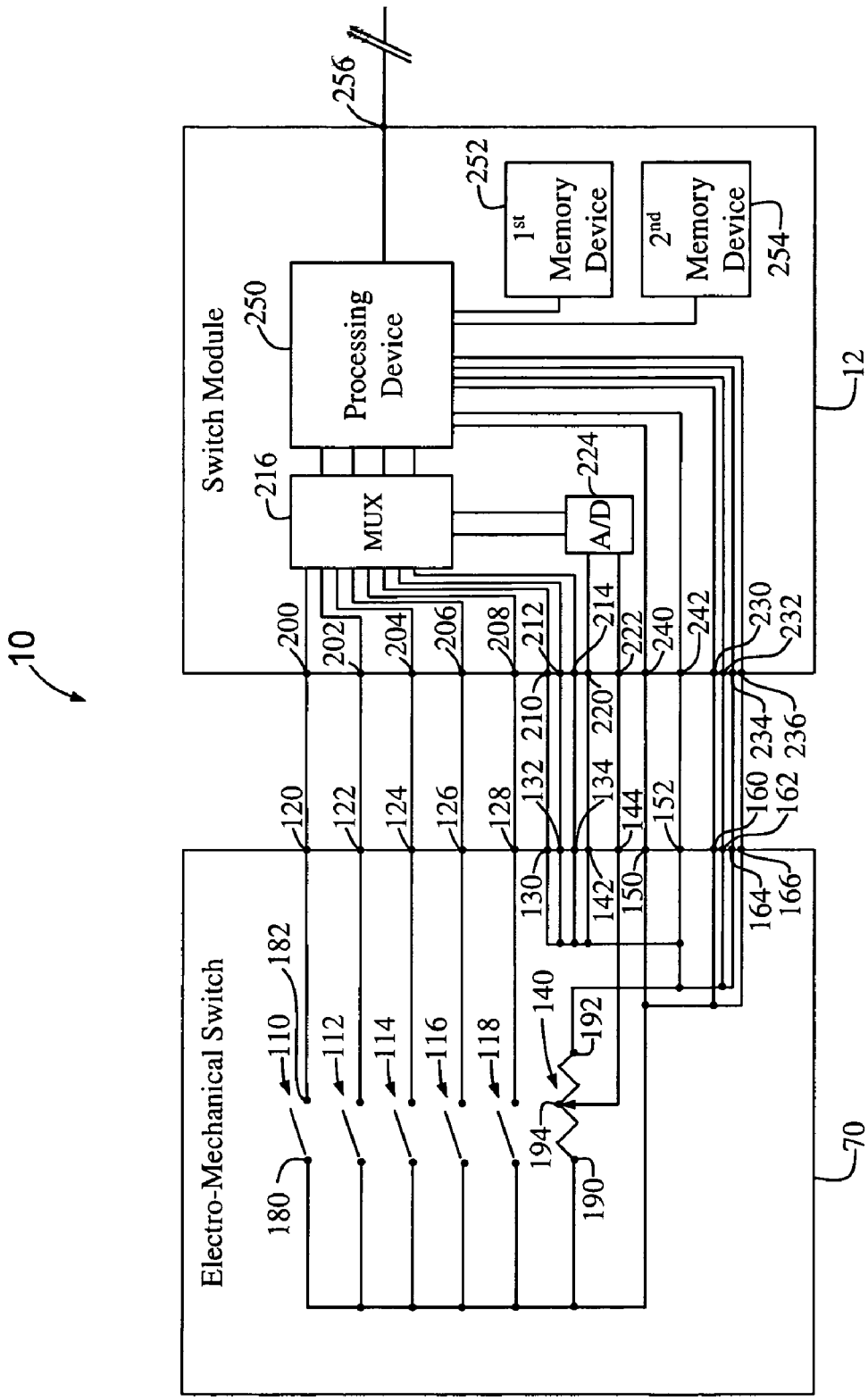
FIG. 3 is a more detailed view of an embodiment of the switch system of FIG. 2.

Switch module 12 acts as an electrical interface by receiving activation signals from the various electro-mechanical switches and converting those signals into electronic control messages that are then sent to a corresponding electrical device. The switch module 12 will be subsequently described in greater detail, but generally includes an integrated circuit having a series of signal inputs, an electronic processing device 90, a first electronic memory device 92, a second electronic memory device 94, and a series of signal outputs. Preferably, processing device 90 is capable of being utilized by other systems, such as a column electronics module system (CEM), however, it could be dedicated solely to switch system 10. First memory device 92 is preferably a writable memory device electronically coupled to the processing device, such that it is capable of storing information about one or more switches 70. Second memory device 94 is preferably a read only memory device that is also coupled to the processing device 90 such that it is capable of storing a look-up table for converting activation signals into electronic control messages. The switch module is electrically coupled to one or more electrical devices 100–104 and/or one or more electronic control unit(s) 106. In either arrangement, whether the switch module sends an electronic message directly to an electrical device or to an associated ECU, the switch module is providing an electronic control message that controls the operation of the electrical device. Turning now to FIG. 3, a more detailed description of switch system 10 is provided.

Switch system 10 of the present invention generally includes one or more electro-mechanical switches 70 and switch module 12. The electro-mechanical switch 70 shown in FIG. 3 includes digital switching elements 110–118, digital signal outputs 120–134, analog switching element 140, analog signal outputs 142–144, a power signal input 150, a ground signal input 152 and switch identification signal outputs 160–166. As previously stated, switch 70 is mechanically coupled to an operator-activated control (not shown in FIG. 3) such that activation of that control may cause one or more of the switching elements 110–118 or 140 to change state. The particular electro-mechanical switch embodiment shown here is intended for use with lever assembly 16, such that a first lever movement in direction A (please refer to FIG. 1) activates switching element 110 which is associated with a left turn lamp, a second lever movement in direction B activates switching element 112 which is associated with a right turn lamp, a third lever movement in direction C (towards the operator) activates switching element 114 which is associated with one or more headlamp high beams, a fourth lever movement in direction D (away from the operator) activates switching element 116 which is also associated with one or more headlamp high beams, and a fifth lever movement in direction E (depression of the lever into stationary section 32) activates switching element 118 which is associated with one or more fog lamps. Because switching elements 110–118 are generally equivalent, the following discussion of element 110 equally applies to the other switching elements. Switching element 110 could be comprised of one of numerous types of switching elements known in the art, and generally includes an input terminal 180 electrically coupled to power signal input 150 and an output terminal 182 electrically coupled to digital signal output 120. Closure of switching element 110 causes electro-mechanical switch 70 to send an electrical activation signal to switch module 12 via digital signal output 120.

Analog switching element 140 is operably coupled to lever assembly 16 such that it controls a windshield wiper unit and generally includes an input terminal 190, a ground terminal 192 and an output terminal 194. The input terminal is electrically coupled to power signal input 150, the ground terminal is electrically coupled to ground signal input 152, and the output terminal is electrically coupled to analog switch output 144, such that rotational movement of lever handle section 30 in direction F (seen in FIG. 1) causes switching element 140 to send an analog signal to switch module 12 via analog switch output 144. Thus, the rotational position of the handle section affects the state of analog switching element 140, which in turn affects the electrical activation signal provided to the switch module. Preferably, analog switching element 140 is some type of potentiometer.

Digital signal outputs 130–134 and analog signal output 142 are not used in this particular embodiment, and are therefore tied to ground signal input 152. In other electro-mechanical switch embodiments, those particular outputs may be used. The ability to simply tie to ground those signal outputs that are not used provides system 10 with an increased amount of compatibility, as a single switch module 12 is capable of accommodating a variety of electro-mechanical switches 70, each having a different number of switching elements and, hence, a different number of signal outputs.

Switch identification signal outputs 160–166 provide the switch module with an electrical identification signal that uniquely identifies the particular type of electro-mechanical switch involved. In the present embodiment, outputs 160–166 are simply connected to power and ground signal inputs such that a simple four-bit identification signal is generated. However, other embodiments could use one or more resistors, capacitors, codes, etc. to generate a unique identification signal. As will be discussed at greater length, this unique signal is used by the switch module to automatically identify the particular type of electro-mechanical switch currently sending an activation signal.

Turning now to switch module 12, the switch module acts as an intermediary between the various electro-mechanical switches and the corresponding electrical devices, and generally includes digital signal inputs 200–214, multiplexer 216, analog signal inputs 220–222, analog/digital converter 224 (A/D converter), identification signal inputs 230–236, power signal output 240, ground signal output 242, electronic processing device 250, first and second electronic memory devices 252, 254, and signal output 256. Digital signal inputs 200 214 are electrically coupled to digital signal outputs 120–134, respectively, such that they may receive an activation signal on one of those inputs. In the embodiment shown in FIG. 3, signal inputs 210–214 are coupled to ground, as those particular inputs are not being used. Signal inputs 200–208, however, are coupled to actual switching elements such that activation of one of those elements causes an electrical activation signal to be sent from the electro-mechanical switch to the switch module. In order to reduce the number of pins on processing device 250, both the digital and analog signal inputs pass through a multiplexer 216, as is widely known in the art. Multiplexer 216 is not necessary and could be removed such that signal inputs 200–214 are directly connected to the processing device or some other electronic component.

Analog signal inputs 220 and 222 receive analog activation signals from analog signal outputs 142 and 144, respectively, and are electrically coupled to analog/digital converter 224. Once the analog activation signal from switch 70 has been converted to a digital signal, it is fed to multiplexer 216, just as the previously discussed digital signal inputs. In this manner, analog operator-activated controls, such as a multi-position turn dial, can activate an analog switching element 140 such that an analog activation signal is provided to the switch module, converted into a digital signal, and eventually provided to electronic processing device 250.

Power signal output 240 and ground signal output 242 provide a low voltage DC signal and a ground signal, respectively, from the switch module to the electro-mechanical switch. These signals are utilized by the electro-mechanical switch for several purposes, amongst those purposes is to provide switch identification signal outputs 160–166 with the four-bit identification signal previously discussed. In this particular embodiment, the first and last switch identification outputs 160 and 166 are tied to the power signal and the second and third switch identification outputs 162 and 164 are tied to the ground signal, thus producing an identification signal that reads 1001. As will be subsequently explained in more detail, the switch module utilizes this four bit identification signal to identify and configure the particular electro-mechanical switch being used, as numerous types of electro-mechanical switches may be plugged into a single type of switch module. Because this particular embodiment uses a four bit identification signal, a total of 16 unique identification signals, and hence 16 different types of electro-mechanical switches, could be used with this switch module ($2^4=16$). If the system needs to accommodate more types of electro-mechanical switches, the number of switch identification signal outputs must be increased.

Electronic processing device 250 executes software code such that it is able to automatically identify and configure the particular electro-mechanical switch coupled to the switch module, and is also capable of converting an electrical activation signal from the electro-mechanical switch 70 into an electronic control message that controls the operation of a corresponding electrical device. Preferably, the electronic processing device is one from the Motorolla 68HC908 family, however, other processing devices could just as easily be used. Processing device 250 is coupled to multiplexer 216 such that it may receive various activation signals from either the digital signal inputs or the analog signal inputs. The electronic processing device could be comprised of any appropriate microprocessor, microcontroller or other electronic device, and preferably is shared by other electronic systems. For instance, in the steering column application previously discussed, the microprocessor, as well as the switch module in general, could be part of a lager column electronic module that services other electrical systems, such as a steering wheel position sensor system, an air bag system, an ignition system, etc. In an example such as this, each system could share the electronic processing device, one or more electronic memory devices, as well as other circuit components.

Electronic memory devices 252 and 254 are used by the electronic processing device 250 for communicating between electro-mechanical switch 70 and the electrical device being controlled. Generally, first electronic memory device 250 includes any writeable memory device (RAM, EEPROM, etc.) capable of storing a value. Second memory device 252 includes any readable memory device (ROM, EPROM, EEPROM, etc.) capable of containing a look-up table, or similar data structure. Numerous types of components may be used for either the first or second electronic memory devices, as long as processing device 250 is able to write information to the first memory device and read information from the second memory device. This includes the possibility of first and second memory devices being the same component, as well as, first and second memory devices being located within the electronic processing device 250.

Signal output 256 can be electrically coupled to electrical devices 100, 102, or 104 of FIG. 2, or an electronic control unit that controls the operation of an electrical device, such as ECU 106. Output 256 preferably comprises a low or high speed bus connection, but could include one or more serial outputs, several independent outputs, a single output, etc., as long as output 256 was capable of providing an electronic message to one or more electrical devices.

Figure 4A:
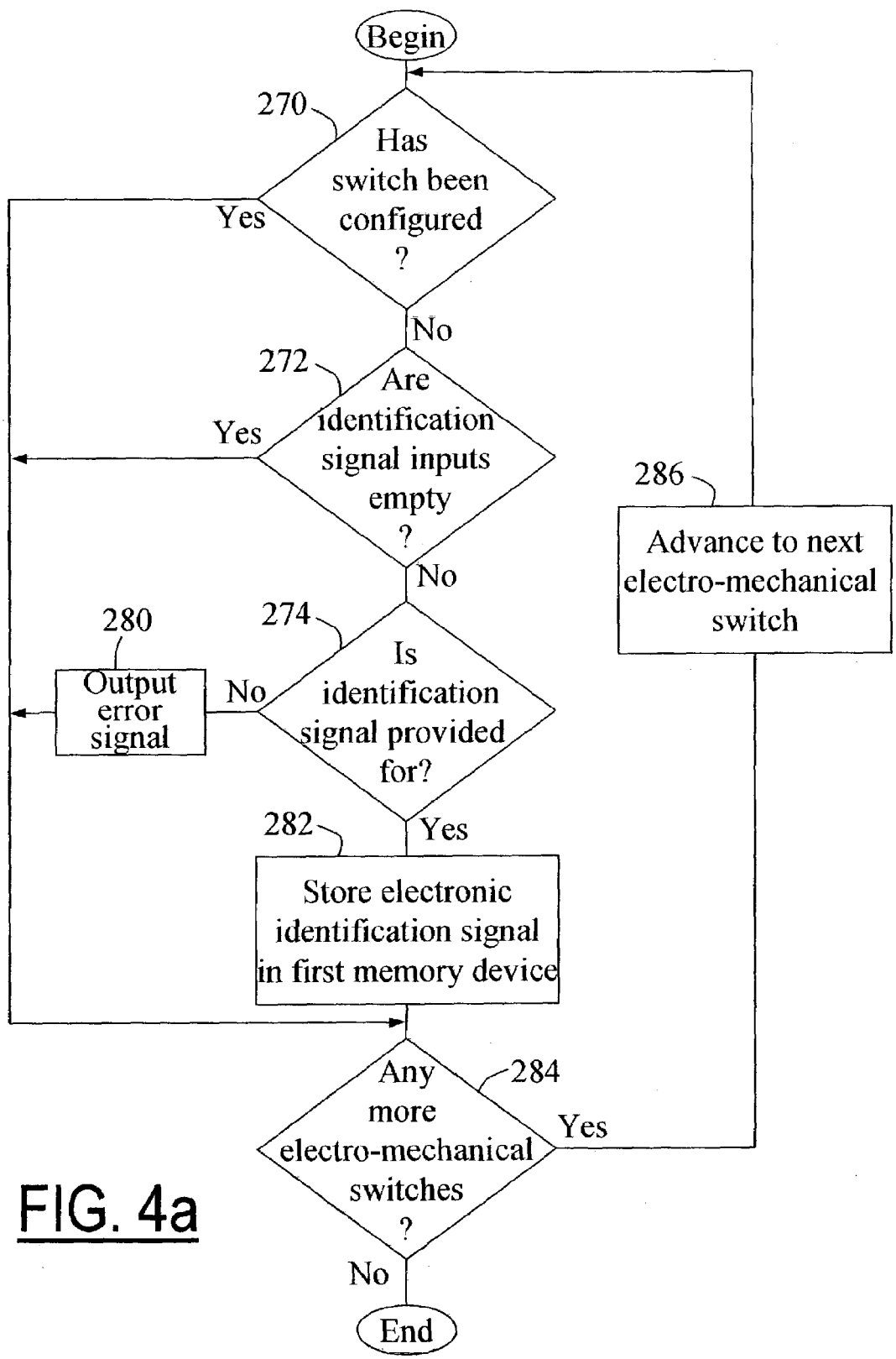
FIG. 4a is a flowchart showing a method for automatically configuring an embodiment of the switch system of the present invention.

Discussion of the operation of switch system 10 has been divided into two main sections; FIG. 4a discusses a configuration process and FIG. 4b discusses an actual operation process. Referring now to FIG. 4a, switch system 10 automatically configures each electro-mechanical switch that is coupled to switch module 12, such that subsequent operation of an operator-activated control can be properly interpreted by the switch module. The configuration process can be executed every time the vehicle is turned on, it can be executed a single time (after manufacturing), it can be selectively executed at the request of an operator, service technician, etc. or at any other appropriate interval. The configuration process begins by focusing on a first electro-mechanical switch.

Beginning with step 270, processing device 250 determines if a first electro-mechanical switch 70 has already been configured by reading a corresponding location in either first or second electronic memory devices 252, 254. If that memory location is empty, then no configuration has yet occurred and operation proceeds to step 272. If that memory location is already populated with information, then that electro-mechanical switch has already been configured and operation passes to a subsequent step. Preferably, this configuration information would be stored in non-volatile memory, such as the second electronic memory device, such that it was not lost during a power removal. Step 272 determines if there is an identification signal being provided on identification signal inputs 230–236. If no signal is present, then the switch module knows that this particular connection member does not currently have an electro-mechanical switch inserted into it, and accordingly begins the same process for a second electro-mechanical switch. If an identification signal is present, then processing device 250 reads that signal and proceeds to step 274. Step 274 compares the identification signal just read to a look-up table or other data structure stored in second electronic memory device 254 to determine if that particular identification signal has been provided for. If it is not, step 280 sends an error message to the operator instructing them that this particular switch is not a valid, recognized switch, and the configuration process proceeds to subsequent electro-mechanical switches. If the identification signal is provided for in the look-up table, then step 282 stores the identification signal in a corresponding location in the first electronic memory device 252.

This completes the configuration process for the first electro-mechanical switch. Step 284 then checks for other electro-mechanical switches. If switch module 12 does not provide for any more electro-mechanical switches, then the configuration process is complete. If the switch module is capable of accommodating more electro-mechanical switches, then step 286 advances to the next series of electro-mechanical switch inputs and begins the process over again. In this manner, switch system 10 is able to automatically configure each and every electro-mechanical switch that is coupled to switch module 12 such that subsequent operation of any of those switches will be properly interpreted by the switch module.

Figure 4B:
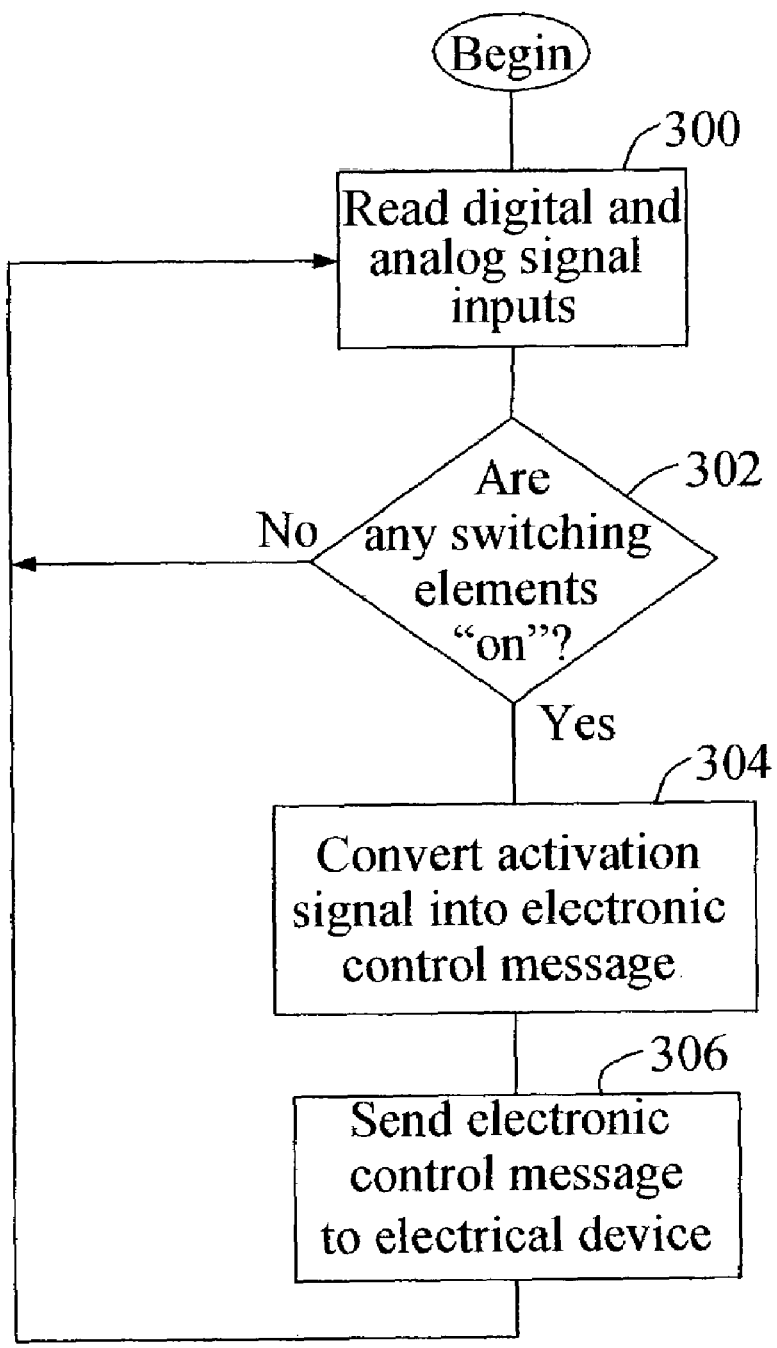
FIG. 4b is a flowchart showing a method for operating an embodiment of the switch system of the present invention.

Referring now to FIG. 4b, the actual operation process for switch system 10 is shown and generally involves receiving an electrical activation signal from an electro-mechanical switch, converting that signal into an electronic control message, and providing that message to a corresponding electrical device. Beginning with step 300, processing device 250 reads all of the signal inputs, both the digital inputs 200–214 and the analog inputs 220–222, to determine the state of each corresponding switching element 110–118 and 140. If a particular switching element is in an "on" or "closed" position, step 302 recognizes that a corresponding operator-activated control has been engaged. For example, if lever assembly 16 had been engaged and pivoted downwards (left turn signal), then switching element 110 would be closed, and digital signal input 200 would carry an electrical activation signal indicating that the left turn signal control had been engaged. According to the embodiment shown, the digital and analog signal inputs would provide their signals to multiplexer 216 and A/D converter 224, which in turn would provide electronic processing device 250 with a series of signals representative of the state of the various switching elements.

Alternatively, the electronic processing device could read all of the signal inputs and simply look for a change in the signals from the previous time they were read. If a change has occurred, device 250 could determine which of the switching elements was responsible for the change; this is a signal processing technique that is well known in the art.

If the processing device determines that one of the switching elements is "on", then step 304 converts the activation signal into an electronic control message by means of a look-up table stored in second memory device 254. Each electro-mechanical switch, as indicated by its unique identification signal, has its own look-up table. Thus, upon receipt of an activation signal the processing device reads the four-bit identification signal from the first memory device in order to select the appropriate look-up table from the second memory device. Once the appropriate look-up table has been selected, the processing device references the particular activation signal that has been triggered such that a corresponding electronic control message is generated and outputted via signal output 256, step 306. Thus, each digital and analog signal input being used (200–208, 222 in the embodiment of FIG. 3) has a corresponding entry in the look-up table assigned to identification code 1001, such that the processing device knows what message to output when it receives a certain activation signal. Once an electronic control message has been sent to the appropriate electrical device, step 300 begins again by re-reading the digital and analog signal inputs. This process may continue either while the vehicle is on, at all times, or for any other appropriate duration. Moreover, the frequency at which the switch module reads the various signal inputs may be varied to suit a particular application.

It will therefore be apparent that there has been provided in accordance with the present invention a switch system for use with an operator-activated control and electrical device which achieves the aims and advantages specified herein. It will, of course, be understood that the foregoing description is of preferred exemplary embodiments of the invention and that the invention is not limited to the specific embodiments shown. For instance, lever assembly 16 could be designed to plug into a remotely located coupling component, instead of directly plugging into the female connection member of switch module 12. In such an arrangement, engagement of the operator-activated control (a lever handle in the present example) would create a mechanical movement that the coupling component would convert into an electrical activation signal. That signal would be provided to the switch module via some type of electrical connection. This alternative embodiment may be particularly advantageous for those applications where there is insufficient room to mount the operator-activated control adjacent to the switch module.

Also, numerous types of signal processing techniques known in the art could be employed. For example, the power and ground signal inputs 150, 152 could be reversed such that an activation signal was represented by a '0' and not a '1'. Also various types of signal filtering components could be used to improve the state of the electrical signals.

Figure 5:
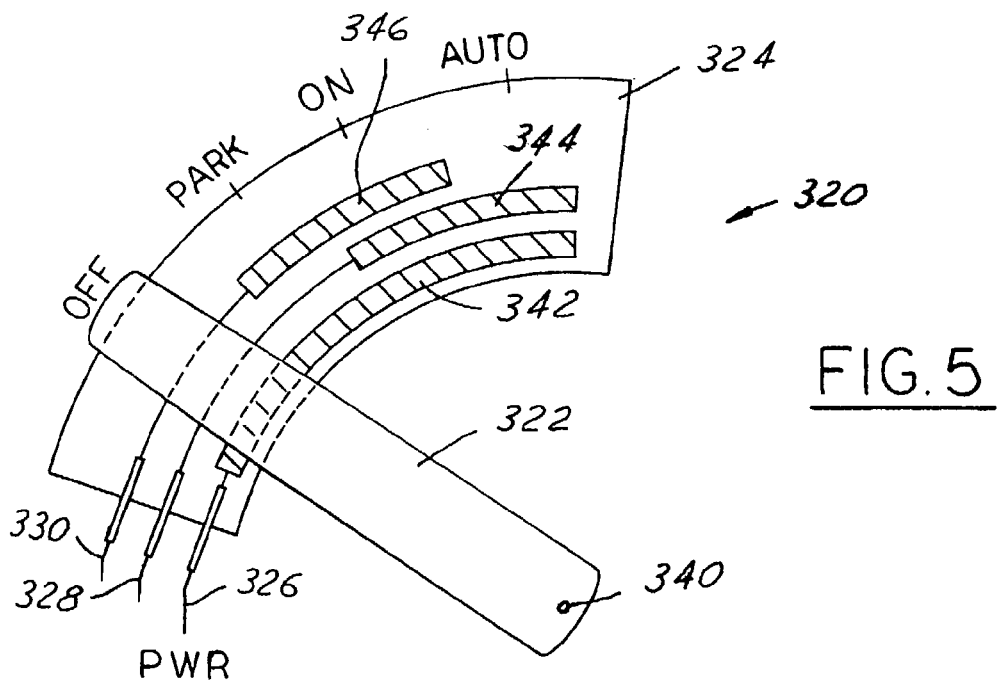
FIG. 5 is a view of a specific embodiment of the electro-mechanical switch of the switch system of the present invention.

According to another embodiment, such as that shown in FIG. 5, switch system 10 could include an electro-mechanical switch 320 that utilizes an error-detecting technique, such as a grey-code. The electro-mechanical switch shown here is of a turn-dial type used in conjunction with the vehicle headlamps, and generally includes a dial section 322, a stationary section 324 with printed contacts, signal input 326 and signal outputs 328 and 330. Dial section 322 is an operator-activated control that may be rotated between four separate operating positions about a pivot point 340. In general, the use of a grey-code requires that movement of dial section 322 between adjacent operating positions only changes a single bit on the two-bit output 238, 330. Therefore, if the switch module detects a change of two bits, it knows that an erroneous activation signal has been received. Stationary section 324 includes a raised contact pad 342 which is electrically coupled to signal input 326, and the stationary section also includes contact pads 344 and 346 which are electrically coupled to signal outputs 328, 330, respectively.

When switch 320 is in the "off" position, as shown in FIG. 5, dial section 322, which has an elongated contact extending along the length of its underside, only contacts raised contact pad 342. Thus, the power signal on 326 is not communicated to either signal output 328 or 330, and the corresponding activation signal sent from switch 320 to the switch module reads '01'. If dial section 322 is rotated to the "park" position, then the contact on the underside of the dial makes contact with raised contact pads 342 and 346, thereby producing an activation signal that reads '10' (assuming (328,330)). If the dial section is further rotated to the "on" position, the dial underside contact makes a connection with all three raised contact pads 342, 344 and 346, thus creating an activation signal reading '11'. Lastly, if the dial section is rotated to the "auto" position, then its underside contact makes contact with raised contact pads 342 and 344, producing an activation signal of '10'. The operation of this electro-mechanical switch, as it relates to a switching system is the same as the electro-mechanical switches discussed earlier. That is, switch 320 sends an electrical activation signal on outputs 328 and 330 that is received by a switch module and is converted into an electronic control message which is then sent to a corresponding electrical device. This grey-coding technique can accommodate switches having a greater number of positions; all that needs to be added are additional signal outputs.

These alternative embodiments are simply some of the embodiments that are envisioned by the present invention, as various changes and modification will become apparent to those skilled in the art and all such changes and modifications are intended to be within the scope of the present invention.

The invention claimed is:

1. A switch system for use with an operator-activated control and an electrical device, the operator-activated control being one of a plurality of control types, comprising:
   an electro-mechanical switch device having an activation signal portion and an identification element and being operably coupled to the operator-activated control, the activation signal portion and the identification element for providing an activation signal and an identification signal, respectively, the identification signal being indicative of a switch device type associated with the electro-mechanical switch device, the switch device type corresponding to the control type of the operator-activated control, wherein said identification element includes one or more elements selected from the group consisting of resistive elements and capacitive elements, and;
   a switch module electrically coupled to said electro-mechanical switch device, including to said identification element, and to the electrical device, said switch module for receiving said activation signal and said identification signal and for providing an electronic control message to the electrical device, wherein engagement of the operator-activated control causes said electro-mechanical switch to send said activation signal to said switch module, said switch module generating said electronic control message as a function of said identification signal in response to receiving said activation signal, and said switch module sends said electronic control message to the electrical device for controlling its operation.

2. The switch system of claim 1, wherein said electro-mechanical switch device further includes a switching element operably coupled to the operator-activated control and electrically coupled to said switch module, such that engagement of the operator-activated control causes said switching element to provide said activation signal to said switch module.

3. The switch system of claim 2, wherein said switching element is a digital switching element.

4. The switch system of claim 2, wherein said switching element is an analog switching element.

5. The switch system of claim 1, wherein said identification element includes one or more hard-wired connections to either a power signal or a ground signal.

6. The switch system of claim 1, wherein said identification element includes one or more resistive elements.

7. The switch system of claim 1, wherein said identification element includes one or more capacitive elements.

8. The switch system of claim 1, wherein said switch module further includes an electronic processing device and one or more electronic memory devices, such that said electronic processing device is capable of writing said identification signal to said electronic memory device(s) and is capable of reading said electronic control message from said memory device(s) in response to said activation signal.

9. The switch system of claim 8, wherein said switch module uses said identification signal to identify a data structure that provides for the conversion of said activation signal into said electronic control message.

10. The switch system of claim 9, wherein said data structure is a look-up table.

11. The switch system of claim 1, wherein said electronic control message is provided directly to the electrical device.

12. The switch system of claim 1, wherein said electronic control message is provided to the electrical device via an electronic control unit used for controlling the operation of the device.

13. The switch system of claim 1, wherein said system employs an error-sensing technique when reading said activation signal.

14. The switch system of claim 13, where said error-sensing technique is a grey-code type technique such that movement of the operator-activated control between adjacent positions causes said activation signal to only change by one bit of data.

15. The switch system of claim 1, wherein a single said switch modules may be electrically coupled to a plurality of said electro-mechanical switches.

16. The switch system of claim 1, wherein a single said switch module is electrically coupled to a variety of different types of said electro-mechanical switches, each type of said switch providing a unique electrical identification signal.

17. The switch system of claim 1, wherein said switch system is mounted to a vehicle steering column assembly.

18. A method for automatically configuring and operating a switch system for use with an operator-activated control and an electrical device, the operator-activated control being one of a plurality of control types, said method comprising the steps of:

(a) providing an electro-mechanical switch device, (b) providing a switch module electrically coupled to said electro-mechanical switch device, (c) said electro-mechanical switch device providing an electrical identification signal to said switch module, the identification signal being indicative of a switch device type associated with the electro-mechanical switch device, the switch device type corresponding to the control type of the operator-activated control, (d) said electro-mechanical switch device providing an electrical activation signal to said switch module in response to an engagement of the operator-activated control, said switch module utilizing an error detecting technique that detects errors by looking for a change in said activation signal of more than a predetermined number of bits;

(e) said switch module generating an electronic control message as a function of said identification signal in response to receiving said activation signal, and;

(f) said switch module providing said electronic control message to the electrical device for controlling the operation of the electrical device.

19. The method of claim 18, wherein step (e) further includes the steps of utilizing said identification signal to identify a corresponding data structure such that said data structure provides for the conversion of said activation signal to said electronic control message.

20. The method of claim 18, wherein said error detecting technique is a grey-code type technique.

* * * * *